United States Patent
Grosskopf et al.

(10) Patent No.: US 8,454,326 B2
(45) Date of Patent: Jun. 4, 2013

(54) IDLER GEAR AND JOURNAL BEARING ASSEMBLY FOR A GENERATOR

(75) Inventors: Andrew P. Grosskopf, Rockford, IL (US); Eric A. Brust, Machesney Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 909 days.

(21) Appl. No.: 12/437,567

(22) Filed: May 8, 2009

(65) Prior Publication Data
US 2010/0284836 A1 Nov. 11, 2010

(51) Int. Cl.
*F04B 17/00* (2006.01)

(52) U.S. Cl.
USPC ......... 417/410.1; 384/297; 475/215; 475/217

(58) Field of Classification Search
USPC ................. 417/410.1; 384/297; 475/215, 217
See application file for complete search history.

(56) References Cited

U.S. PATENT DOCUMENTS

| | | | |
|---|---|---|---|
| 4,844,202 A | 7/1989 | Maresko | |
| 4,909,354 A | 3/1990 | Fluegel | |
| 4,997,072 A | 3/1991 | Lapthorne | |
| 6,023,134 A | 2/2000 | Carl et al. | |
| 6,357,220 B1 | 3/2002 | Snyder et al. | |
| 6,364,772 B1 | 4/2002 | Sugden | |
| 6,651,633 B1* | 11/2003 | Jones | 123/559.1 |
| 7,270,296 B2 | 9/2007 | Box et al. | |
| 7,481,396 B2* | 1/2009 | Kish | 244/60 |
| 7,481,736 B2 | 1/2009 | Miller et al. | |
| 7,500,365 B2* | 3/2009 | Suciu et al. | 60/802 |
| 2007/0051846 A1* | 3/2007 | Box et al. | 244/60 |

* cited by examiner

*Primary Examiner* — Charles Freay
*Assistant Examiner* — Patrick Hamo
(74) *Attorney, Agent, or Firm* — Carlson, Gaskey & Olds, P.C.

(57) ABSTRACT

A generator includes an aluminum housing having an end plate secured to a housing portion. The housing portion and the end plate respectively include first and second bores. The end plate includes a wall with a boss providing a bore. The wall provides a lubrication passage in fluid communication with the bore. An idler gear includes a shaft having opposing first and second ends respectively supported in the first and second bores. A generator is arranged within the housing and is rotationally coupled to the idler gear. First and second impregnated carbon journal bearings respectively include a first inner and outer bearing diameter and a second inner and outer bearing diameter. The first and second outer bearing diameters are in press fit relationship with the first and second bores respectively. The inner diameters are fixed relative to their respective outer diameter.

13 Claims, 5 Drawing Sheets

IDLER GEAR AND JOURNAL BEARING ASSEMBLY FOR A GENERATOR

BACKGROUND

The present disclosure relates to an idler gear assembly, and more particularly to a generator idler gear assembly.

Integrated drive generators and other generators incorporate journal bearings to support idler gear shafts. The housing supporting the journal bearings are typically constructed from magnesium and the journal bearings are typically constructed from either bronze or carbon/graphite material. Due to the difference in thermal expansion coefficients between the housing and the bearing materials, an anti-rotation feature is typically used to affix the bearings to the housing.

In one example, a cup-shaped aluminum intermediate housing carries one of the journal bearings and is secured to the magnesium housing. The opposite journal bearing is press fit into the magnesium housing. A Belleville washer is arranged between the journal bearing and a cover, which is secured to the intermediate housing. The Belleville washer seats the journal bearing in the intermediate housing bore and exerts sufficient axial force on the journal bearing to prevent rotation and provides axial retention of the journal bearing within the intermediate housing. In another example, an outer diameter of the journal bearing is knurled to better maintain its press fit and provide an anti-rotation feature throughout the generator operating temperature range of −65° F.-400° F. (54° C.-204° C.). The knurl feature also provides axial retention. Employing additional structures and machining to retain the journal bearings in their bores adds complexity and cost to the idler gear assembly.

SUMMARY

A generator includes a housing having an end plate secured to a housing portion that together provide a cavity. The housing portion and the end plate respectively include first and second bores.

In one example, the end plate includes a wall having a side with a boss extending from the side to a terminal end. The boss provides a bore including a seat and a cylindrical surface radially outward of the seat and extending to the terminal end. The wall has a perimeter providing fastening features configured to secure the end plate to the housing portion. The wall provides a lubrication passage in fluid communication with the bore.

An idler gear includes a shaft having opposing first and second ends respectively supported in the first and second bores. In one example, the first and second ends respectively include first and second outer shaft diameters extending from a respective shoulder. The first and second outer shaft diameters are supported in the first and second bores. A generator is arranged within the housing and is rotationally coupled to the idler gear.

First and second journal bearings respectively include a first inner and outer bearing diameter and a second inner and outer bearing diameter. The first and second outer bearing diameters are in press fit relationship with the first and second bores respectively. The first journal bearing is proud of the terminal end to engage the first shoulder. The first and second inner bearing diameters are in slip fit engagement with the first and second shaft ends respectively. The inner diameters are fixed relative to their respective outer diameter, providing a fixed bearing as opposed to a roller bearing in the example.

In one example, the first and second journal bearings are constructed from a second material and the housing is constructed from a first material. The first and second materials are different from one another and respectively include first and second coefficients of thermal expansion having a ratio of greater that 0.2, but less than 1.0.

In one example, the journal bearings are provided by an impregnated carbon body having defining the inner bearing diameter and the outer bearing diameter, which provide a bearing thickness. The body includes a height. The outer bearing diameter to inner bearing diameter provides a first ratio of approximately 1.3-1.5, and the inner bearing diameter to height provides a second ratio of approximately 1.5-1.9.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
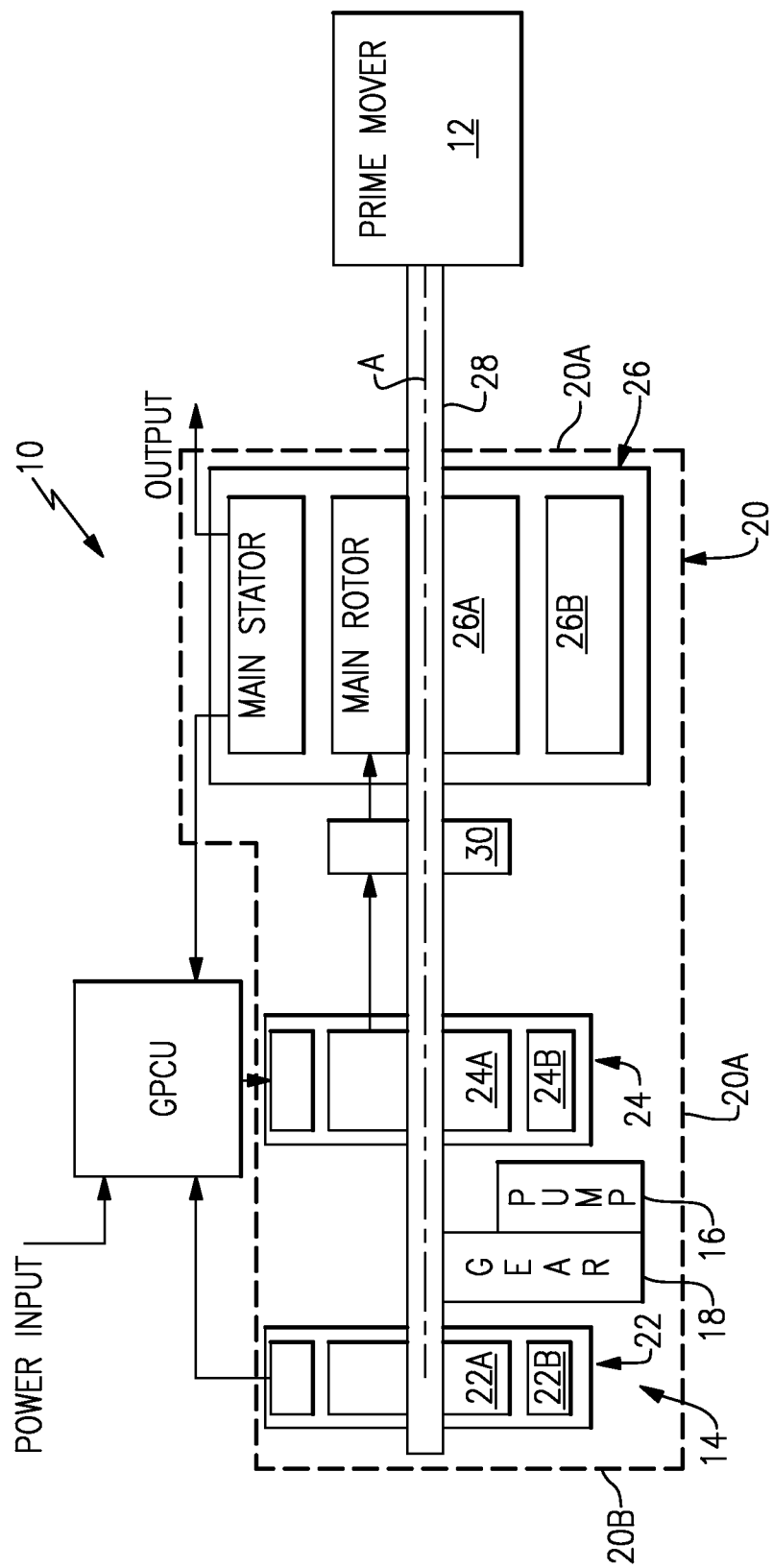
FIG. 1 is a general schematic sectional view of a generator for a gas turbine engine.

FIG. 1 schematically illustrates selected portions of an example generator 10 driven by a prime mover 12 such as a gas turbine engine and for generating electrical current when being driven by the prime mover 12. The generator 10 may generally include a dynamoelectric portion 14, hydraulic pump 16 and a gear train 18, which includes an idler gear assembly 48 (FIG. 2), all contained within a common housing assembly 20. Although a variable frequency generator (VFG) is illustrated in the disclosed embodiment, it should be understood that other generator systems such as an Integrated Drive Generator (IDG) will also benefit herefrom. These types of generators may be particularly well suited for aircraft applications.

The dynamoelectric portion 14 in the disclosed, non-limiting embodiment is a 3-phase machine that includes three machines 22, 24 and 26 mounted on a rotor shaft 28 along an axis of rotation A. Stator assemblies 22B, 24B, 26B of the three machines are installed in the housing assembly 20 and the three rotor assemblies 22A, 24A, 26A are installed on the rotor shaft 28. The housing assembly 20 may be closed with a drive end cover assembly or housing portion 20A through which the rotor shaft 28 extends and an end plate 20B. The housing portion 20A and end plate 20B are constructed from an aluminum alloy.

The first machine 22 includes a pilot exciter (PE) permanent magnet generator (PMG) with a PE rotor assembly 22A and a stator assembly 22B. The PE stator assembly 22B supplies power for generator excitation, as well as power for other components of the electrical system. The second machine 24 includes a main exciter (ME) with a ME rotor assembly 24A and a stator assembly 24B. The ME receives field excitation from the PE through a GPCU (Generator Power Control Unit). The output of the ME rotor assembly 24A is supplied to a shaft mounted diode pack 30. The diode pack 30 may be divided into six diode groups to provide a 3-phase full wave bridge rectification. The DC output of the diode pack 30 supplies the third machine 26.

Figure 2:
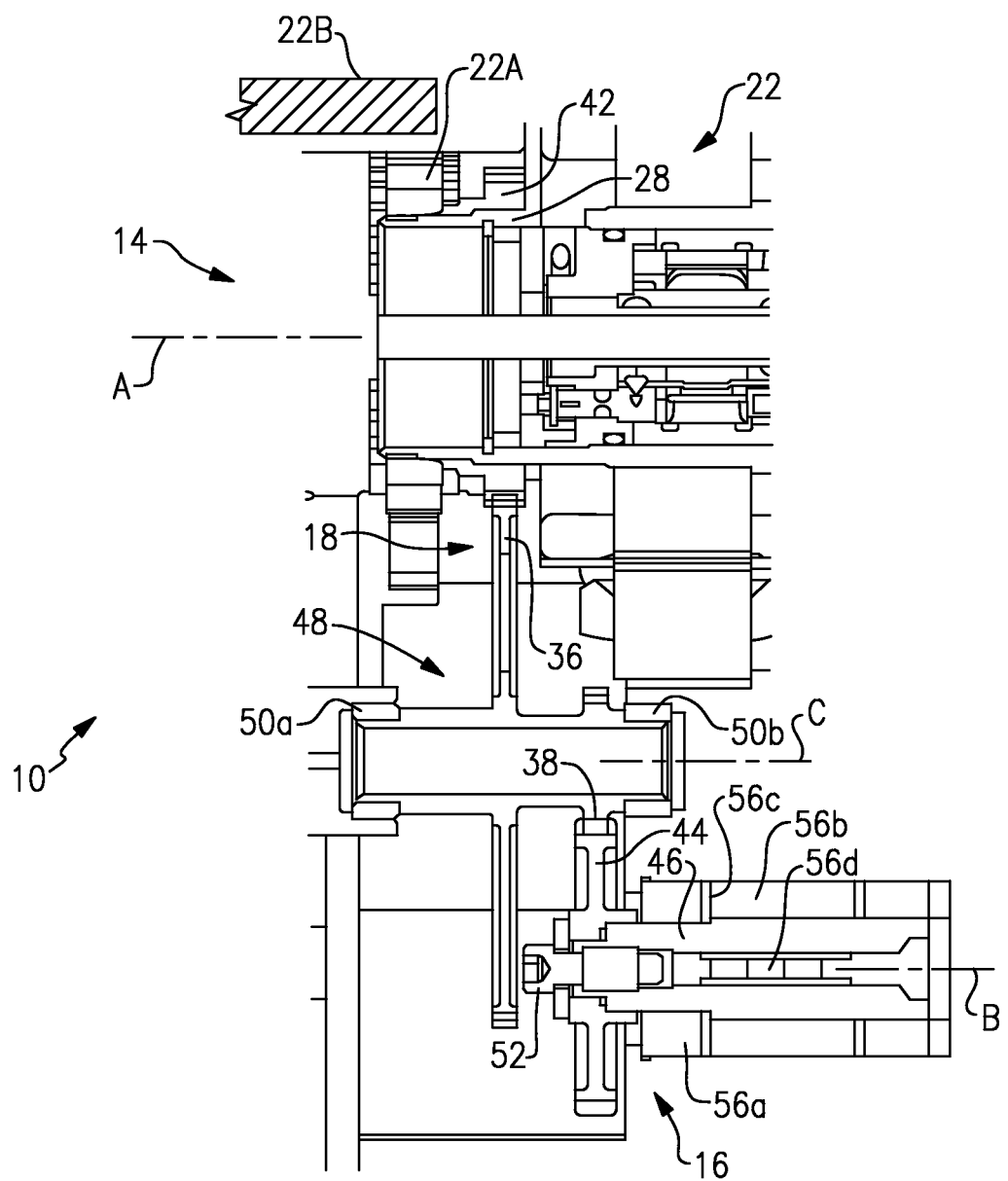
FIG. 2 illustrates an example generator having a pump and a gear train including an idler gear assembly.

FIG. 2 illustrates selected portions of an example generator 10. In the illustrated example, an idler gear assembly 48 is coupled between the hydraulic pump 16 and the dynamoelectric portion 14. The generator 10 includes a gear train 18 for driving the hydraulic pump 16 via the dynamoelectric portion 14. In this case, the gear train 18 is a gear reduction train to drive the hydraulic pump 16 at a relatively slower speed than the dynamoelectric portion 14. However, the gear train 18 may be modified in other examples.

The hydraulic pump 16 includes a pump gear 44 mounted for rotation on a pump shaft 46. In this example, the pump gear is mounted with a fastener 52 that extends axially, relative to a central axis B of a pump shaft 46, through the pump gear 44 into the pump shaft 46. The remainder of the hydraulic pump 16 is a known arrangement and may include journal bearings 56a for rotatably supporting the pump shaft 46, a liner sleeve 56b, a wear plate 56c between the journal bearings 56a and liner sleeve 56b, and one or more vanes 56d that are rotatable with the pump shaft 46 for moving a fluid, for example.

Figure 4:
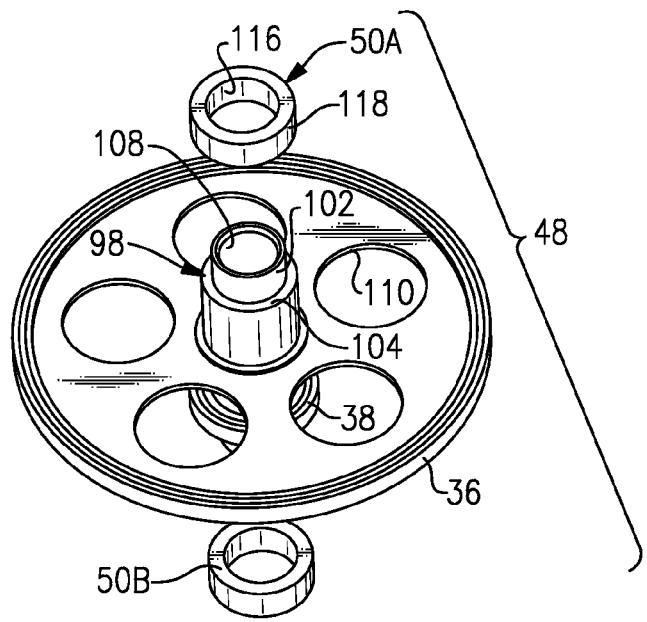
FIG. 4 is an enlarged exploded view of the idler gear assembly.

The gear train 18 includes a rotor gear 42 mounted on the rotor shaft 28, the pump gear 44 mounted on the pump shaft 46 of the hydraulic pump 16, and an idler gear assembly 48 mounted for rotation axis C on journal bearings 50A and 50B, which are constructed from a carbon material impregnated with copper in one example. The differential between the coefficients of thermal expansion of the aluminum alloy housing 20 and the journal bearings 50 is a ratio greater 0.2, but less than 1.0. In the example, the housing 20 has a greater coefficient of thermal expansion than the journal bearings 50. Small differentials in the coefficients of thermal expansion enables the use of a press fit without additional journal bearing retention features. The idler gear assembly 48 includes an idler gear shaft 34 having first and second gears 36, 38. The first gear 36 is in meshing engagement with the rotor gear 42. The first gear 36 includes lightening holes 110 (FIG. 4). The second gear 38 is in meshing engagement with the pump gear 44.

Figure 3A:
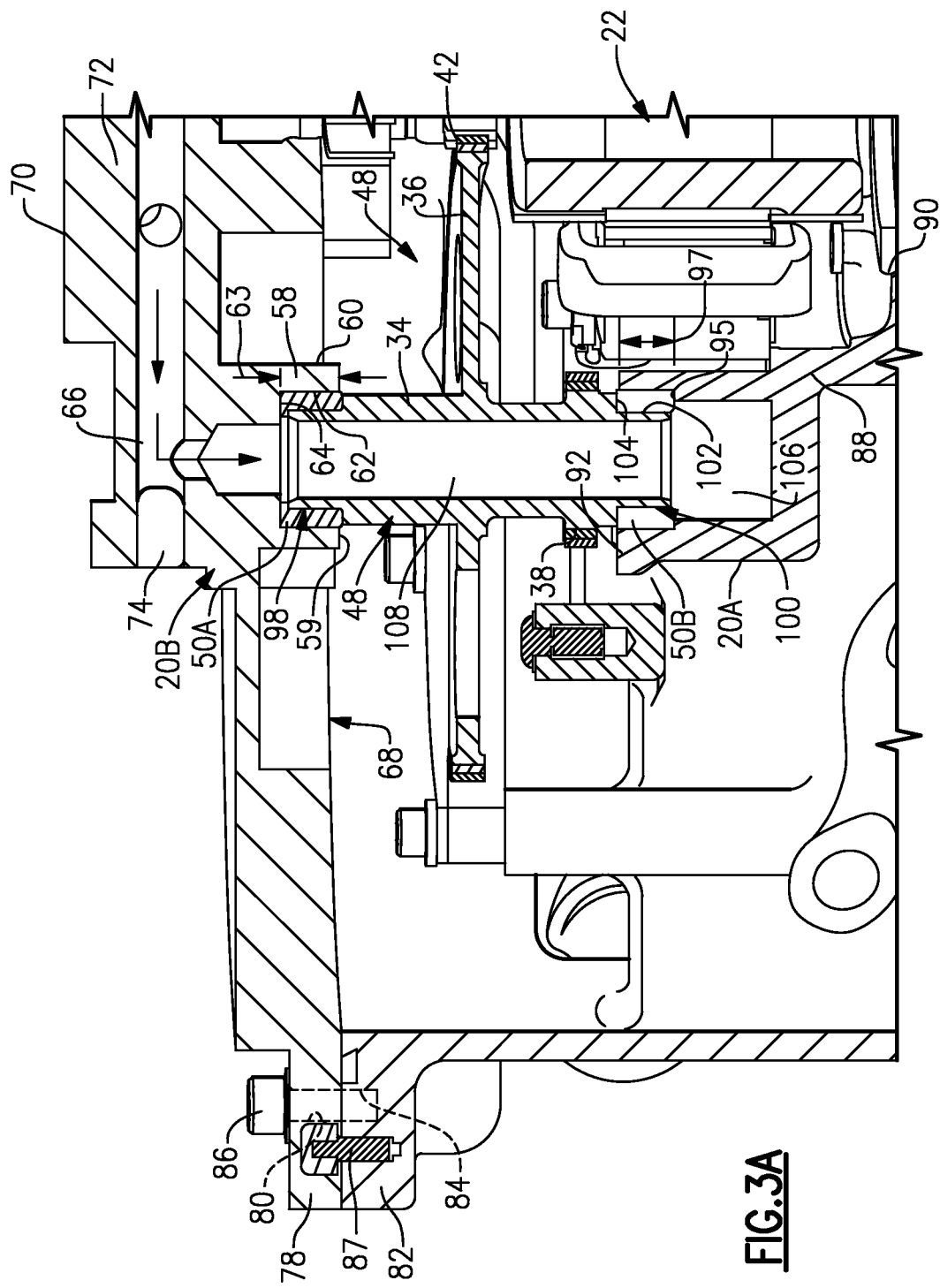
FIG. 3A is a cross-sectional view of a portion of the generator through the idler gear assembly, including a housing portion and an end cover.
Figure 3B:
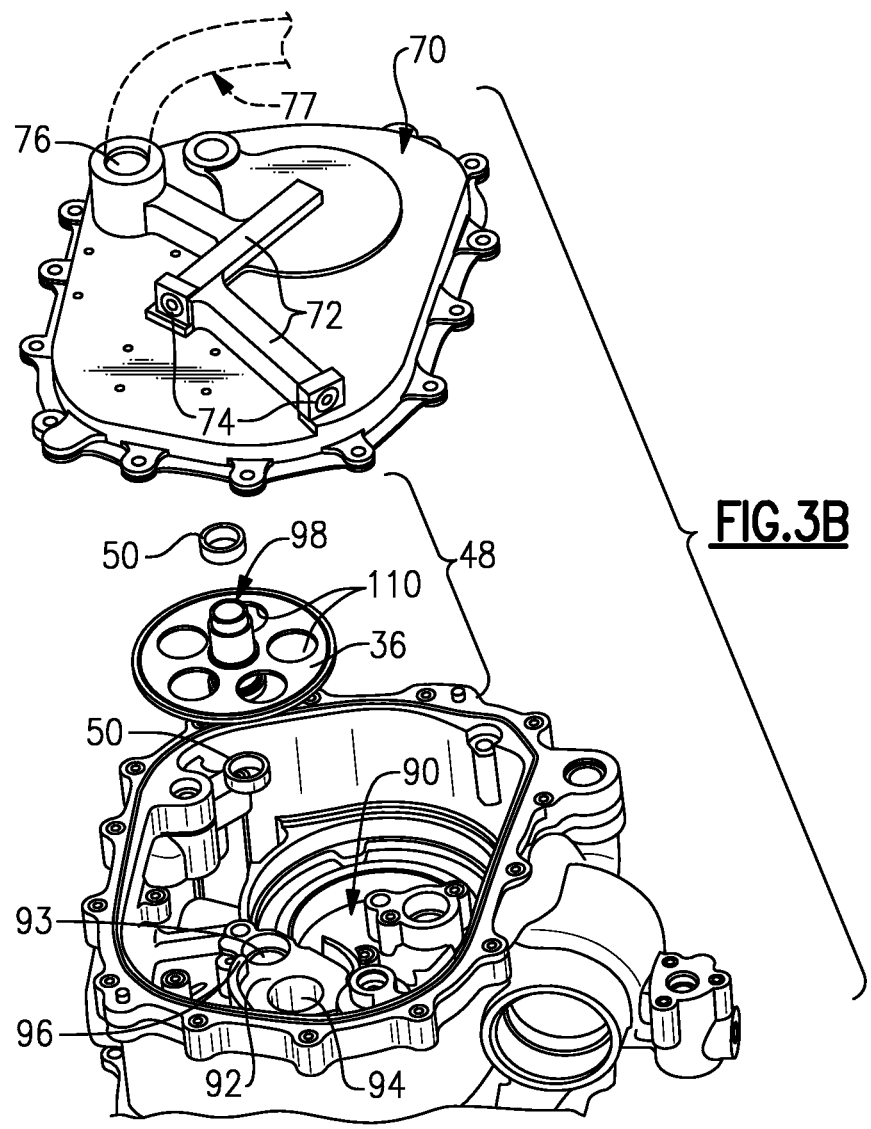
FIG. 3B is an exploded view of the idler gear assembly, the housing portion and the end cover.

Referring to FIGS. 3A, 3B and 4, the idler gear assembly 48 is shown in more detail. The end plate 20B includes a boss 58 extending from a first side 68 to a terminal end 59. The boss 58 includes an outer perimeter 60 and an inner diameter 62, coaxial with axis C (FIG. 2), that provides a cylindrical surface. The inner diameter 62 extends a depth 63 (0.370±0.001 inch (9.398 mm±0.025 mm)), for example) from a seat 64 to the terminal end 59. The end plate 20B is used to support one end of the idler gear assembly 48, thus eliminating the costly intermediate housing structure that was located internal to the housing.

A second side 70 of the end plate 20B opposite the first side 68 includes ribs 72. Interconnecting holes are drilled into the rib 72 to provide a lubrication passage 66 that is in fluid communication with the bore 62 to efficiently deliver lubricant to the journal bearings 50. Plugs 74 are inserted into ends of the holes in the ribs 72 that form the lubrication passage 66. A feature 76 is provided on the second side 70 and is configured to receive a lubrication fitting. In one example, the feature 76 is a threaded hole, and an external lubrication line 77 is secured thereto to provide lubrication to the journal bearings 50A, 50B through the lubrication passage 66.

The end plate 20B includes a perimeter 78 providing a securing feature, which is provided by multiple holes 80 in the example. The housing portion 20A includes a flange 82 having holes 84 aligned with the holes 80 when the end plate 20B is installed onto the housing portion 20A. Locating dowels 87 are provided in the housing portion 20A to align the housing portion 20A and end plate 20B to one another. Fasteners 86 are disposed within the holes 80 and received within the holes 84, which are threaded in one example. A seal (not shown) is provided between the flange 82 and perimeter 78 when the housing 20A is assembled.

The housing portion 20A includes a wall 88 recessed from the flange 82 to provide a cavity that receives the gear train 18. An opening 90, coaxial with axis A (FIGS. 1 and 2), is provided in the wall 88 to receive a portion of the rotor 26A. A proud surface 92 extends from the wall 88. The proud surface 92 includes a bore 93, coaxial with axis C, for rotationally supporting one end of the idler gear assembly 48. An arcuate wall 96 extends from the proud surface 92 and at least partially surrounds the pump gear 44 (FIG. 2) when installed. The pump shaft 46 extends through the hole 94, which is coaxial with axis B (FIG. 2).

The bore 93 includes a seat 95 recessed a depth 97 (0.370±0.001 inch (9.398 mm±0.025 mm)), for example, from the proud surface 92. The journal bearing 50B is installed in a press-fit relationship in the bore 93. The second end 100 is received by the journal bearing 50B in a slip-fit relationship. The journal bearing 50A is installed in a press-fit relationship in the bore 62. The first end 98 is received by the journal bearing 50A in a slip-fit relationship.

The idler gear assembly 48 includes first and second ends 98, 100 that each include a respective outer shaft diameter 102 extending from a shoulder 104. The outer shaft diameters 102 are supported in the inner bearing diameters 116.

The idler gear shaft 34 includes a passage 108 extending between the first and second ends 98, 100. Lubrication from the lubrication passage 66 flows through the passage 108 to the dead-ended cavity 106. In the example lubrication arrangement, lubrication is introduced at a controlled rate into passage 108 through lubrication passage 66, then through the interface of the bearing 50B and shaft end outer diameter 102 and bearing 50A and shaft end outer diameter 98.

Figures 5A, 5B:
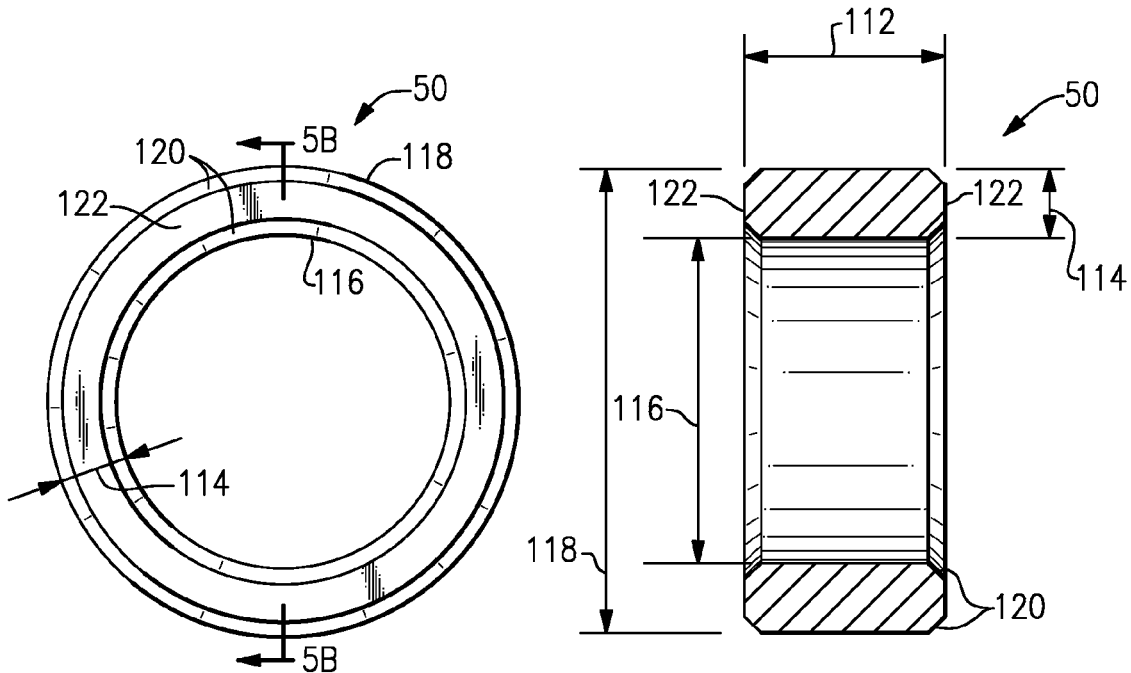
FIG. 5A is a top elevation view of a journal bearing.
FIG. 5B is cross-sectional view of the journal bearing shown in FIG. 5A through its axis.

Referring to FIGS. 5A and 5B, the journal bearings 50 include a height 112 and a thickness 114, which is the difference between the outer diameter 118 and the inner diameter 116. The outer diameter 118 is generally smooth and without knurling. The journal bearing outer diameter 102 is 0.9200 inch+0.0000/−0.0005 inch (23.3680 mm+0.0000 mm/−0.0127 mm), the housing is 0.9150 inch+0.0007/−0.0000 inch (23.2410 mm+0.0178 mm/−0.0000 mm) giving an interference range of 0.0038-0.0050 (0.0965 mm-0.1270 mm). In one example, the outer diameter 118 to inner diameter 116 ratio is approximately 1.3-1.5, and 0.9200 inch (23.3680 mm) and 0.6505 inch (16.5227 mm), for example. The ratio of inner diameter 116 to height 112 is approximately 1.5-1.9. In one example, the height is 0.385 inch. The journal bearing dimensions provide a good press fit with their respective bores 62, 93 throughout the operating temperature range of −65° F.-400° F. (−54° C.-204° C.).

The outer shaft diameter 102 is approximately 0.001-0.004 inch (0.025 mm-0.102 mm) less than the inner diameter 116 in the installed state and for the temperature range of −65° F.-400° F. (−54° C.-204° C.). The decrease in the inner diameter 116 as a result of the press fit is accounted for when the journal bearings are initially manufactured so that the journal bearings 50A, 50B do not have to be machined subsequent to installation into the housing portion 20A and end plate 20B.

Accounting for the press fit eliminates the need for further machining, which reduces the cost. Chamfers 120 are provided where ends 122 join the inner and outer diameters 116, 118. The height 112 of each journal bearing 50A, 50B is greater than the associated depth 63, 97 so that each journal bearing 50A, 50B extends beyond its bore 62, 93 to engage the adjacent shoulder 104.

The foregoing description is exemplary rather than defined by the limitations within. Various non-limiting embodiments are disclosed herein, however, one of ordinary skill in the art would recognize that various modifications and variations in light of the above teachings will fall within the scope of the claims. It is therefore to be understood that within the scope of the claims, the disclosure may be practiced other than as specifically described. For that reason the following claims should be studied to determine true scope and content.

What is claimed is:

1. A generator comprising:
   a housing including an end plate secured to a housing portion that together provide a cavity, the housing portion and the end plate respectively including first and second bores;
   an idler gear including a shaft having opposing first and second ends respectively supported in the first and second bores;
   first and second journal bearings respectively including a first inner and outer diameter and a second inner and outer diameter, the first and second outer diameters in press fit relationship with the first and second bores respectively, and the first and second inner diameters in slip fit engagement with the first and second ends respectively, the inner diameters fixed relative to their respective outer diameter;
   a rotor gear arranged within the housing and rotationally coupled to the idler gear; and
   a dynamoelectric portion arranged in the housing and providing the rotor gear.

2. The generator according to claim 1, wherein the housing portion and the end plate enclose the generator, and the housing portion includes an opening through which the generator extends, the generator including a rotor shaft rotatable about a first axis and the idler gear rotatable about a second axis offset from and parallel with the first axis.

3. The generator according to claim 1, wherein the end plate is secured directly to the housing portion.

4. The generator according to claim 1, wherein the dynamoelectric portion includes a pilot exciter including a pilot rotor and a pilot stator, a main exciter including a main rotor and a main stator, and a third machine including a third rotor and a third stator, the rotors mounted on a common rotor shaft that supports the rotor gear.

5. A generator comprising:
   a housing including an end plate secured to a housing portion that together provide a cavity, the housing portion and the end plate respectively including first and second bores;
   an idler gear including a shaft having opposing first and second ends respectively supported in the first and second bores;
   first and second journal bearings respectively including a first inner and outer diameter and a second inner and outer diameter, the first and second outer diameters in press fit relationship with the first and second bores respectively, and the first and second inner diameters in slip fit engagement with the first and second ends respectively, the inner diameters fixed relative to their respective outer diameter;
   a rotor gear arranged within the housing and rotationally coupled to the idler gear;
   the housing portion and the end plate enclose the generator, and the housing portion includes an opening through which the generator extends, the generator including a rotor shaft rotatable about a first axis and the idler gear rotatable about a second axis offset from and parallel with the first axis; and
   a hydraulic pump enclosed within the housing, the hydraulic pump having a pump shaft extending through a hole in the housing portion and rotatable about a third axis offset from and parallel to the first and second axes, the hydraulic pump rotationally coupled to the generator via the idler gear.

6. The generator according to claim 5, including a dynamoelectric portion arranged in the housing and providing the rotor gear.

7. The generator according to claim 6, wherein the dynamoelectric portion includes a pilot exciter including a pilot rotor and a pilot stator, a main exciter including a main rotor and a main stator, and a third machine including a third rotor and a third stator, the rotors mounted on a common rotor shaft that supports the rotor gear.

8. A generator comprising:
   a housing including an end plate secured to a housing portion that together provide a cavity, the housing portion and the end plate respectively including first and second bores;
   an idler gear including a shaft having opposing first and second ends respectively supported in the first and second bores;
   first and second journal bearings respectively including a first inner and outer diameter and a second inner and outer diameter, the first and second outer diameters in press fit relationship with the first and second bores respectively, and the first and second inner diameters in slip fit engagement with the first and second ends respectively, the inner diameters fixed relative to their respective outer diameter;
   a rotor gear arranged within the housing and rotationally coupled to the idler gear; and
   the end plate includes a lubrication passage in fluid communication with the first bore, the idler gear includes a passage and the housing portion includes a dead-ended cavity in fluid communication with the second bore, the lubrication passage fluidly connected to the dead-ended cavity through the passage.

9. A generator comprising:
   a housing including an end plate secured to a housing portion that together provide a cavity, the housing portion and the end plate respectively including first and second bores;
   an idler gear including a shaft having opposing first and second ends respectively supported in the first and second bores;
   first and second journal bearings respectively including a first inner and outer diameter and a second inner and outer diameter, the first and second outer diameters in press fit relationship with the first and second bores respectively and the first and second inner diameters in slip fit engagement with the first and second ends respectively, the inner diameters fixed relative to their respective outer diameter;
   a rotor gear arranged within the housing and rotationally coupled to the idler gear; and
   the housing is constructed from a first material, the idler gear first and second ends respectively including first and second outer shaft diameters extending from a respective shoulder, the first and second outer shaft diameters supported in the first and second bores, and the first and second journal bearing are constructed from a second material and extend proud from the first and second bores to engage the first and second shoulders respectively, and the first and second inner diameters in slip fit engagement with the first and second ends respectively, wherein the first and second materials are different than one another and respectively include first and second coefficients of thermal expansion having a ratio of greater than 0.2, but less than 1.0.

10. The generator according to claim 9, wherein the first material is an aluminum alloy and the second material is an impregnated carbon material.

11. The generator according to claim 9, wherein the journal bearing includes a height of approximately 0.385 inch (9.779 mm) and the bore depths are approximately 0.370 inch (9.398 mm).

12. The generator according to claim 11, wherein the outer bearing diameters and in direct engagement with the bores and the outer shaft diameters are in direct engagement with the inner bearing diameters.

13. The generator according to claim 12, wherein the outer bearing diameters are generally smooth cylindrical surfaces.

* * * * *